Jan. 5, 1960     R. C. FERGASON     2,919,954
COTTON HARVESTER
Filed July 17, 1958

Inventor
Rector C. Fergason
By Robert W. Fahrbach
Attorney

United States Patent Office 2,919,954
Patented Jan. 5, 1960

2,919,954
COTTON HARVESTER

Rector C. Fergason, Gadsden, Ala., assignor to Allis-Chalmers Manufacturing Company, Milwaukee, Wis.

Application July 17, 1958, Serial No. 749,267

4 Claims. (Cl. 302—17)

The present invention relates in general to harvesting machines and more particularly to cotton harvesters wherein during their travel through a field, cotton is removed from standing plants and collected in a suitable container.

Cotton harvesting machines commonly utilize a pneumatic conveying system for transferring the harvested cotton all or a portion of the distance from the harvesting unit to the collecting container. Usually this collecting container is in the form of a sheet metal basket with perforated side walls. One advantage of conveying the cotton pneumatically to such as basket lies in the ability of the air stream which carries the harvested material into the basket to effect a further separation of dirt, leaves and chaff from the seed cotton. This separation is effected by blowing these foreign materials on through the perforated basket wall. This separation, to the extent that it is effective, enhances the quality of the harvested product ultimately removed from the basket of the harvester, but the separating action is dependent upon the maintenance of the free opening area in the basket wall which faces the pneumatic conveyer outlet. If fibers of cotton and such foreign material as may be present in the harvested product delivered to the basket are allowed to adhere to the basket wall, an accumulation will quickly cause a reduction of the free opening and a consequent reduction of the air flow through this wall surface obstructing the separating action.

To overcome the above problems a deflector may be provided which directs the cotton fiber downward into the basket of the harvester in such a manner as to maintain the area of free wall opening that is necessary to sustain the separating action. Simultaneously the deflector must not create at another location the condition it was meant to eliminate on the inside surface of the perforated basket wall. To accomplish this it is necessary that the deflector be self-cleaning and where this involves having movable structural parts these parts must not become fouled with one another or with the basket perforations.

Previous attempts have been made to solve these problems. Designs have been utilized which incorporate inclined rods or bars and others which use devices of arcuate deflecting rods. Forms of deflectors have also been used which incorporate wiping devices which cooperate with the bars of the deflector to perform the cleaning function. None of these contemplated solutions which depended upon the movement of cotton along inclined deflecting elements have proven entirely satisfactory in use.

The deflectors with inclined or arcuate rod members tend to allow the seed cotton and other materials to adhere causing a matted condition to arise which just as seriously impairs separation as the same condition on the interior of the basket wall facing the discharge outlet of the pneumatic conveyer. Where cooperating cleaning bars are provided to be passed between a corresponding series of bars of the deflector unit it has been found in practice that the resulting cleaning action is not as complete as would seem probable or be desired. The cleaning bars rather than completely cleaning the deflector unit of adhering cotton are apt to merely pull on the seed cotton and string out the seed cotton between the cleaning bars and deflector unit.

The deflector unit of this invention is composed of a series of deflecting rods or bars disposed in transverse confronting relation to a blower discharge outlet. These bars are pivotally suspended individually from an upper portion of the basket and restrained from swinging in the direction of blower discharge beyond a predetermined limit. This method of connecting the component rod members of the deflector assembly allows these members a sufficiently free pivotal action so that they may swing relative to each other with a wavelike motion during the course of their oscillations while the harvesting unit is in motion. This type of relative pivotal movement causes the seed cotton to move downward along the bars or rods and drop into the basket with the result that the deflector is effectively self-cleaning.

The deflector is mounted sufficiently away from the apertured basket side wall which confronts the discharge outlet to enable an adequate oscillatory wave action to occur without the rods becoming fouled in the container surface while at the same time not adversely affecting the proper loading of the basket. The pivotal suspension of the rods of the deflector further keeps the deflector unit, which is necessarily downwardly disposed within the basket, from impeding the process of unloading a full container.

A successful deflecting mechanism should also achieve the commonly sought after advantages of structural simplicity, ease and economy of manufacture, and minimum maintenance requirements in operation.

Generally it is an object of this invention to provide an improved cotton harvester, and more particularly one wherein trash and other foreign matter are separated fom the harvested material and emitted from a collecting basket for the cotton.

More specifically, it is an object of this invention to provide an improved cotton cleaning and collecting system incorporating a deflector unit that will prevent the accumulation of cotton fibers and foreign materials on an apertured container wall opposite a pneumatic conveyer outlet.

It is a further object of the invention to provide an improved cotton cleaning and collecting system of the hereinabove outlined character wherein the harvested material is delivered to the deflector by a pneumatic conveying system and wherein the fore and aft tilting and lateral swaying movements to which the harvester is normally subjected during its propulsion across a field will actuate the deflector so that the deflector will shed material which may tend to accumulate on it.

A further object of the invention is to provide an improved cotton cleaning and collectnig system of the hereinabove outlined character wherein the deflector incorporates a number of swingably suspended rods or the like and wherein the movement of the rods due to the tilting and swaying movements of the harvester is controlled so that they will not become fouled with one another or with the trash emitting apertures of the basket.

Another object of this invention is to provide an improved cotton cleaning and collecting system of the above outlined character which may be manufactured at relatively low cost and which is simple and dependable in operation.

These and other objects and advantages are obtained by the present invention, various novel features of which will be apparent from the following description and drawings disclosing the invention and will be more particularly pointed out in the claims.

Referring to the drawings.

Figure 1:
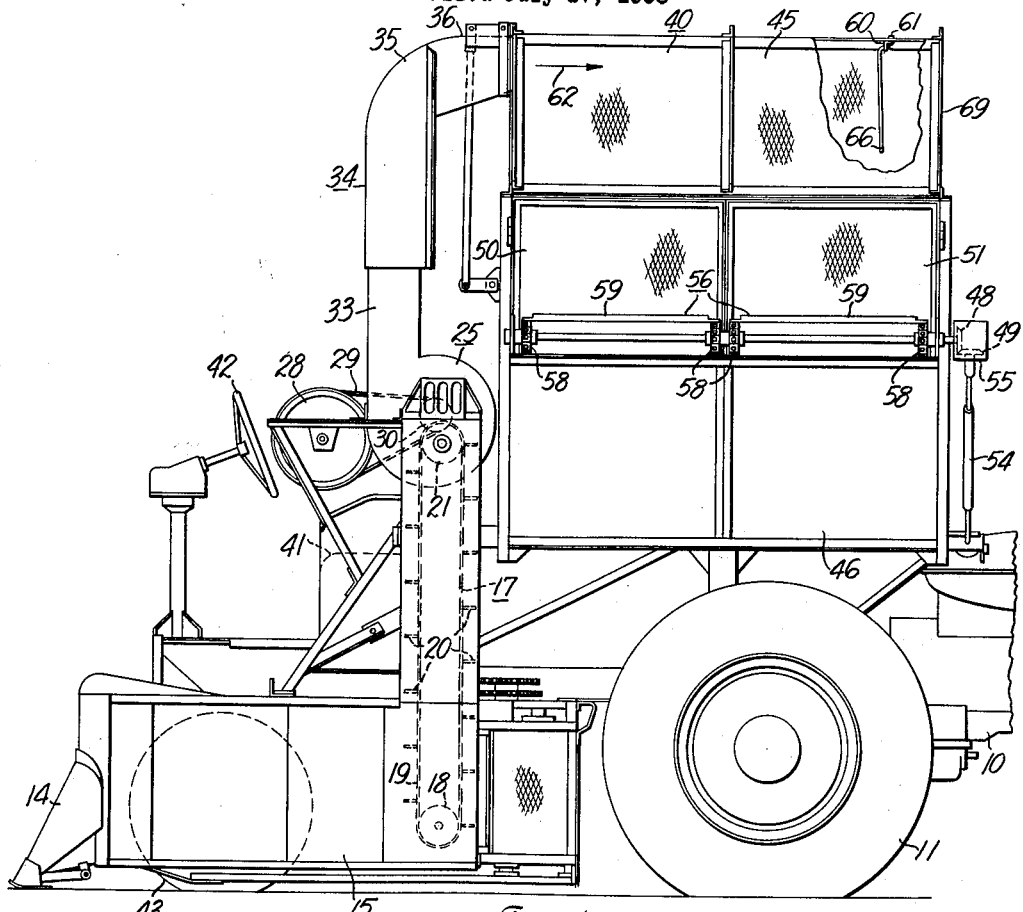
Fig. 1 is a partial side view of a cotton picker with the basket partially broken away to show the deflector assembly.

Fig. 1 shows a cotton picker with a conventional type picking unit 15. The power for the unit is supplied by an engine (not shown) mounted on the cantilever frame 10. The engine is operatively connected to the ground engaging wheels 11 by a conventional power train (not shown).

At the forward end of the cotton picker is a stalk divider 14 attached to the picking unit 15. Cotton is picked by the picking unit and delivered to a mechanical elevating conveyer 17. This conveyer, shown in phantom view, is of the endless belt type having a lower idler pulley 18, a belt 19 with cotton carrying flights 20 and an upper drive pulley 21. This conveyer carries the harvested product to the suction side of a blower 25.

The suction side of the blower 25 is the inlet of the pneumatic conveying system. A driving sheave 28, a V-belt 29 and the impeller sheave 30 supply power to the impeller (not shown) of the blower. The harvested product passes through the impeller blading and is driven up the conveyer spout 33 by the force of the air blast initiated by the impeller. The conveyer spout telescopes into the guide duct 34, which guide duct has an upper elbow portion 35 directing the harvested products into the basket 40.

The telescoping action between the conveyer spout 33 and the guide duct 34 compensates for the upward and downward adjustment of the picking unit 15 which allows for varying crop conditions. An operator's seat 41 is provided, in front of which is located a steering wheel 42 which controls the dirigible front ground engaging wheels 43.

The basic details of the cotton picker are to be found more fully disclosed in my patent, U.S. 2,671,298, and the combined mechanical and pneumatic conveyer system is completely disclosed in my patent application S.N. 592,812, filed June 21, 1956, now Patent No. 2,862,342, granted December 2, 1958. These items are disclosed to show the environment of a cotton picker and do not form a part of the present invention.

The guide duct top wall 36 provides a horizontal guide surface leading to the opening in the basket. The basket is shown constructed of expanded metal which provides a substantial free opening area. The perforated upper hood portion 45 of the basket is permanently fixed to the underlying body portion of the basket. The lower portion 46, visible in the drawing, is an upwardly tilted floor extension which pivots downward to the same grade as the container floor when it is desired to unload the basket 40. With the floor extension 46 in the lowered position the doors 50 and 51 which pivot about hinges 52 (two of which are shown) may be opened. The basket is pivotable on a longitudinal axis by a means, which is not shown, to raise the side having the floor extension 46 and doors 50 and 51. Unloading is effected by supplying power through shaft 54 and the bevel gears 48 and 49 in the housing 55 to the raddle 56 composed of the chains 58 and crossbars 59, which function to discharge the harvested product from the open side of the basket.

At the upper rear of the basket in Fig. 1 a section is shown broken away exposing a side view of the deflector unit of this invention. An angle support member 60 is attached to the basket 40 by bolts 61. To this support member 60 a series of bars 66 (Fig. 2) with turned upper end portions 67 (Fig. 3) are attached in a manner allowing pivotal motion. The bars are freely pivotable transversely and have a limited pivotal action in the direction of the air blast indicated by the arrow 62 in Fig. 1. This limitation is effected by making the diameter of the opening in the support member 60 greater than the diameter of the turned bar end portion 67 which is received by the opening. Wall portions of the basket, including the vertical rear wall 69 of the basket hood 45, are constructed of expanded sheet metal in conformity with conventional practice. The rear wall 69 of the basket presents a perforated air permeable, trash emitting wall portion in transversely extending relation to the direction of discharge 62 of material from the outlet of the pneumatic conveyer guide duct 34. The deflector unit is placed in a location as near the perforated rear wall 69 of the basket hood 45 as possible while maintaining enough horizontal spacing to cause the bars to attain the limit of their rearward pivotal movement without making contact with the expanded metal surface of the rear wall 69.

Figure 2:
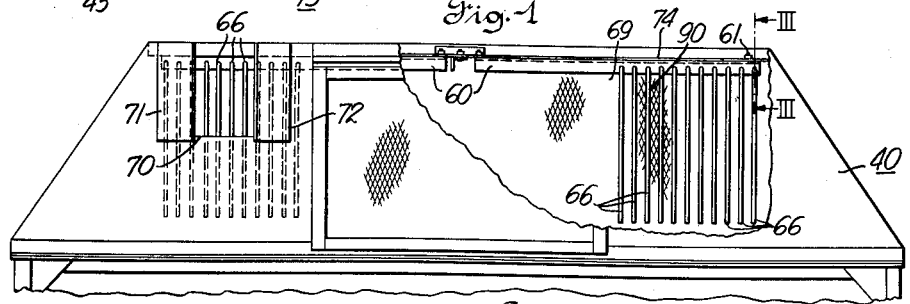
Fig. 2 is a front elevation of the upper portion of the basket partially broken away showing the deflector assembly.

Fig. 2 shows a front elevation of the perforated upper or hood portion of the container 40. The discharge outlet of the guide duct 34 communicates with the basket 40 through the basket opening 70 which is flanked by slidably adjustable doors 71 and 72, which are necessary to compensate for the adjustability of this two row machine to accommodate varying row widths. Each assembly of deflector bars 66 comprises a sufficient number of bars so as to have a series of such deflecting bars in confronting relation to the basket opening 70 and thus the discharge outlet of the guide duct 34 at whatever row spacing is selected.

Figures 3, 4:
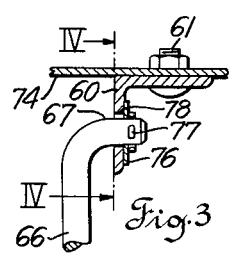
Fig. 3 is a cross section of the deflector assembly taken along line III—III of Fig. 2.
Fig. 4 is a detail sectional view along line IV—IV of Fig. 3.

A cross section of the deflector unit is shown in Fig. 3 with the support member 60 attached by bolts 61 to the top wall 74 of the basket 40. The bar 66 has an angled journal portion 67 which is pivotally suspended in a circular opening 78. This suspension affords motion pivotally about the axis of journal portion 67, swinging movement transversely of the axis and a combination of these movements resulting in a simulated gyrating motion of the individual bars. The diameter of the journaled portion 67 and the diameter of the opening 78 are relatively proportioned such that the bar 66 will be free to swing within predetermined limits back and forth in the direction of the air blast which is discharged from the guide duct 34 as indicated by the arrow 62. Referring to Figs. 3 and 4 it will be noted that the diameter of the journaled portion 67 is smaller than the inside diameter of the hole 78. The journal 67 rests on the forward bottom surface of hole 78 and due to the spacing between the upper portion of journal 67 and the rearward upper edge of hole 78 the rod is free to swing back and forth; however, rearward swinging movement of the bar 66 is limited by contact of the upper portion of the journal 67 with the upper rear portion of the hole 78. Other corresponding surface areas of the journal 67 and the hole 78 would in a similar manner limit the forward swinging movement of the bar 66.

The journal portion 67 of the bar 66 is retained in the opening 78 by the washer 76 and the cotter pin 77. The washer 76 and cotter pin 77, however, are mounted on the journal portion 67 in a position leaving a sufficient length of cylindrical journal section to preclude any limiting of the forward and backward swinging motion by the washer 76 and cotter pin 77.

The normal attitude of the bar 66 is downward with a slight inclination to the rear as the lower portion of journal 67 rests on the forward lower edge of the hole 78 in the support member 60 as the center of gravity of the bar 66 seeks a position vertically below the point of contact between the journal portion 67 and the forward lower portion of the surface formed by the hole 78 in the support member 60.

Figure 5:
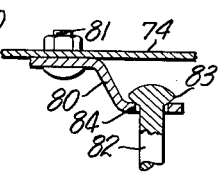
Fig. 5 is an illustration in cross section of another embodiment showing deflector bars with upset upper end portions mounted in oversize openings.

Fig. 5 shows another embodiment of the invention of this application wherein a support member 80 is attached to the basket top portion 74 by bolts 81. The support member 80 has a series of holes 84 in the horizontal portion which are in horizontally spaced relation. The bars 82 in this embodiment are straight with an upset end portion 83, which configuration causes them to be normally disposed in a vertical position. The diameter of the body of the bar 82 is smaller, by a predetermined amount, than the opening in support member 80 afforded by the hole 84. The rearward swinging motion of the bar 82 is restrained when the forward surface of the bar 82 contacts the upper forward edge of hole 84 as the rearward side of the bar 82 simultaneously contacts the lower rearward edge of hole 84. Similarly the swinging motion of bar 82 would be limited in any given direction with the extent of swinging motion in any particular direction determined by the configuration of the hole 84. A round opening 84 would equalize the amount of swinging motion in all directions, while an oval opening would afford greater swinging movement in a chosen direction.

In operation the harvested product is blown through the guide duct 34 and is directed by the upper surface 36 of the guide duct to effect a horizontal discharge into the basket 40. This blows the seed cotton and such foreign matter as is combined with it horizontally to the rear of the basket striking the bars 66 of the deflector unit. The air blast of the pneumatic conveyer causes partial separation of the foreign matter from the seed cotton by blowing these materials on through the apertures 90 (Fig. 2) of the basket wall 69. This separating process is particularly effective in separating the fine chaff and leaf portions from the seed cotton which is valuable since these are the impurities or foreign materials most difficult to remove by the ginning process.

When the seed cotton strikes the bars of the deflector unit and tends to adhere thereto the pivotal motion of the series of deflector bars forming the deflector assembly causes the seed cotton to move downward and drop into the basket below the deflector bars. This self-cleaning action is effected by the oscillating motion of the series of bars forming the deflector assembly as the vehicle moves through the field and as the deflector is subjected to the air blast of the pneumatic conveyer. This self-cleaning action allows the separation that is effected by the utilization of a pneumatic conveyer unit with its accompanying air blast in combination with a perforated basket wall 69 to be sustained without frequently stopping the harvester to clear the harvested material from the confronting perforated basket wall 69 or from a clogged deflector unit.

The present invention provides a deflector which is self-cleaning while maintaining an effective free area in the deflector unit as well as protecting against the diminution of the free area of the basket wall confronting the pneumatic conveyer discharge outlet. Combined with the maintenance of the separating action afforded by the air blast the deflector is simple in design and manufacture, being formed of standard stock structures and fabricated by economical processes. Further, the deflector does not impair any other function of the unit such as unloading where the pivotal action of the bars avoids interference.

It should be understood that it is not intended to limit the invention to the particular form and details herein shown and described, and that the invention includes such other forms and modifications as are embraced by the appended claims.

What is claimed is:

1. In a cotton harvester, the combination of: a pneumatic conveying system having a conduit means and a basket connected with an outlet of said conduit means for receiving cotton discharged from the latter; said basket presenting a perforated air permeable, trash emitting wall portion in transversely extending relation to the direction of discharge of material from said outlet; and a deflector unit operatively interposed between said outlet and wall portion; said deflector unit including first and second suspension means and presenting a series of swingable bars in laterally confronting relation to said discharge outlet, said first suspension means secured to said basket, said second suspension means associated with said bars individually cooperating with said first suspension means.

2. The combination set forth in claim 1 wherein said first suspension means comprises a support member with a downwardly extending portion secured to an upper portion of said basket and disposed transversely to the direction of material discharge with a series of horizontally spaced openings in said downwardly extending portion and said second suspension means comprises a turned end portion on each of said bars extending respectively through said openings in said support member with securing means preventing withdrawal of said rods from said openings.

3. The combination set forth in claim 1 wherein said first suspension means comprises a support member secured to an upper portion of said basket with a portion presenting a series of horizontally spaced vertical openings and said second suspension means comprises upset upper ends on said bars, said bars extending respectively through the said vertical openings in the said support member.

4. In a cotton harvester, the combination of: a pneumatic conveying system having conduit means and a basket for receiving cotton discharged from the latter; said basket presenting a perforated air permeable, trash emitting wall portion in transversely extending relation to the direction of discharge of material from said outlet; and a deflector unit comprised of a series of rigid swingable bars disposed in horizontally spaced transversely confronting relation to said discharge outlet, and first and second suspension means, said first suspension means secured to said basket and said second suspension means associated with said bars, said first and second suspension means cooperating to permit swinging movement of said rods, said swinging movement being limited in the direction of material discharge.

References Cited in the file of this patent
UNITED STATES PATENTS
1,380,413     Poppenhusen  ------------ June 7, 1921
FOREIGN PATENTS
440,824     Germany  ---------------- Oct. 3, 1924